May 31, 1927.

E. D. TILLYER

EYE TESTING CABINET

Filed Oct. 12, 1925

1,630,281

Inventor

Edgar D. Tillyer.

By Harry H. Styll

Attorney

Patented May 31, 1927.

1,630,281

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-TESTING CABINET.

Application filed October 12, 1925. Serial No. 62,020.

This invention relates generally to new and useful improvements in eye testing apparatus and has more specific reference to an eye testing cabinet employed to determine the visual acuity and astigmatic conditions of the eye.

In the construction of eye testing cabinets of the character stated it has been customary to provide a number of test charts and to position in the rear of each chart, an individual source of illumination. Prior to the present invention these cabinets have been so arranged that the light from the source of illumination would shine directly upon said chart so that a portion thereof, nearest the light, would be brilliantly illuminated while the balance of said chart would be only dully illuminated with the result that while the letters or marking on the chart within the brilliantly illuminated area might be clearly visible to the patient the letters or marking outside of this area would be harder to read and in some cases wholly invisible according to the condition of the eyes of the patient.

This unevenness of the light distribution causes an undue strain on the eyes of the patient and results in the examination not being thorough and efficient as the patient while being able to discern certain of the letters on the chart could not, because of the uneven illumination make out other letters which should have been clearly visible had the entire surface of the chart been uniformly lighted with the consequence that the occulist or optometrist might attribute this to defects of the eye while in fact it was simply a defect in the lighting.

The purpose of the present invention therefore is to overcome these disadvantages and has for its primary object the provision of an eye testing cabinet with new and novel means for producing the uniform distribution of light upon the test charts.

Another object is to provide a test cabinet so constructed that the test charts will be illuminated by an indirect lighting arrangement.

Another object is to provide means for causing the spreading of the light rays in order that the said rays will be thrown upon and uniformly distributed over the entire surface of the test charts.

Another object is to provide such a cabinet which, while simple in construction, will nevertheless be thoroughly efficient in its operation and an advance in the art.

Other objects and advantages of the present invention will become more readily apparent during the course of the following detailed description, reference being had to the accompanying drawings.

In the drawings forming a part of this application and wherein are shown two practical embodiments of the present invention.

Figure 1:
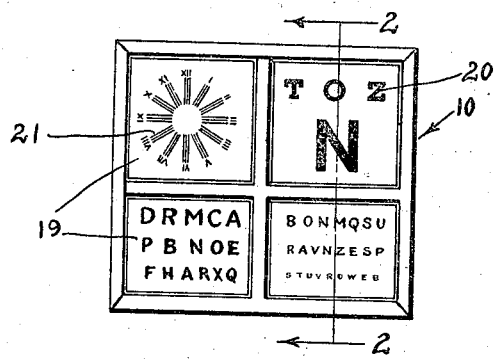
Figure 1 is a front elevation of an eye testing cabinet constructed in accordance with the present invention.
Figure 2:
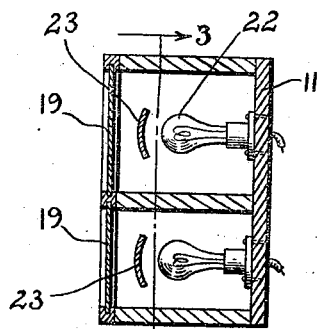
Fig. 2 is a sectional view on line 2—2 of Figure 1.
Figure 3:
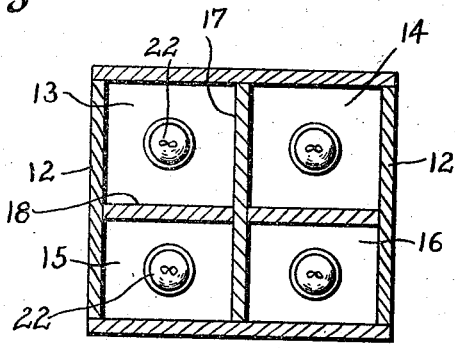
Fig. 3 is a sectional view on line 3—3 of Figure 2.

Referring more particularly to the accompanying drawings wherein like characters of reference denote corresponding parts throughout the several views, the invention comprises in its construction a cabinet generally designated by the reference character 10 and including a rear wall 11 and the side wall 12. The inside of the cabinet is divided into four sections 13, 14, 15 and 16 by means of the vertical and horizontal intersecting partitions 17 and 18.

The inner face of the rear wall 11 together with the top and bottom and side walls of each section are covered with a heavy white coating so as to provide highly reflective surfaces. This coating may be applied directly onto the walls, or if more desirable a separate white lining may be secured thereto.

Each of the said sections has a translucent front wall 19 provided with a visual acuity chart 20 or with an astigmatic chart 21 these charts being employed for testing the eyes of the patient.

Mounted in the rear wall 11 in each of said sections is a source of illumination such as an incandescent lamp 22 adapted for lighting the respective chart and arranged between this lamp and the front wall 19 is a shield or reflector 23, said reflector being mounted within the section in any desired manner and being arranged directly in front of the lamp so as to intercept and direct the rays of light projected therefrom.

Figure 4:
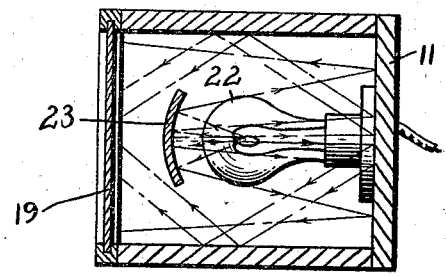
Fig. 4 is an enlarged sectional view of one of the cabinet sections showing the path of travel of the light.

As the rays of light from the source of illumination come into contact with the shield or reflector 23, they will be directed rearwardly and angularly and against the rear and side walls of the section where, due to their reflective surfaces the said walls will cause the rays of light to be re-directed on to the chart and, because of the spreading of the rays of light as they come into contact with the said reflective surfaces they will be evenly and uniformly distributed upon the entire surface of the chart. The general direction of the rays of light is indicated by the arrows in Figure 4.

Figure 5:
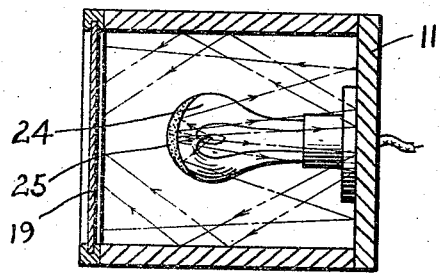
Fig. 5 is a view similar to Figure 4 but showing a slight modification of the invention.

Referring more particularly to Figure 5 wherein is shown another form of the present invention the construction is somewhat modified in that no separate shield or reflector is used but instead the head of the lamp 24 is provided with a densely frosted coating as at 25 which coated portion serves as a reflector and performs the same functions as the aforementioned reflector 23. The principle of operation is the same as described in connection with the first form of the invention. That is to say, the rays of light coming into contact with the frosted portion 25 will be directed against the said side and rear walls of the section and thereupon subsequently redirected upon and uniformly distributed throughout the entire surface of the chart.

From the above it will be readily appreciated that there has been provided an eye testing apparatus containing all of the features of advantage enumerated in the statement of the invention as being desirable in a device of this character. The fact that the light is uniformly distributed upon the entire surface of the chart, will tend to reduce undue strain on the eyes of the patient and will tend toward making the examination of the eye more thorough and efficient.

It will also be understood that various changes may be found desirable in the construction and arrangement of the various parts and that any such changes which properly fall within the scope of the appended claims may be made without departing from or exceeding the spirit of the invention.

As an example, while the cabinet herein shown is divided into four sections, it will of course be appreciated that it may be partitioned into any number of sections desired and the invention is therefore not to be construed as limited to the exact arrangement shown.

Actual photometric measurements of the identical test cabinet with and without the diffusing reflector, show that without the reflector, the brightness of illumination usually varies in a ratio of two to one from the bright to the dark portion of the test chart, while with a reflector as described hereinabove it is possible to reduce this variation in the illumination to ten per cent and is almost impossible to obtain as much variation as twenty per cent even with little care in designing the diffusing reflector.

Having thus described the invention what is claimed is:

1. In an eye testing cabinet, a box having a translucent side having test characters thereon and a reflective covering on the inside walls of the box except on the translucent side, a source of light between the translucent side and the side of the box opposite thereto, and a screen between the light and the translucent side whereby the direct rays from the light are screened from the translucent side.

2. In an eye testing cabinet, a box having a translucent side with test characters thereon and internal divisions dividing the inside of the box into a plurality of compartments of which the translucent side forms one side of each compartment, a reflective covering on the inside walls of each compartment except on the translucent side, a source of light in each compartment and a screen between the light in each compartment and the translucent side whereby the direct rays from the light are screened from the translucent side.

EDGAR D. TILLYER.